(12) United States Patent
Sun et al.

(10) Patent No.: US 12,088,844 B1
(45) Date of Patent: Sep. 10, 2024

(54) DATA PROCESSING METHOD AND APPARATUS FOR IMAGE COMPRESSION, DEVICE, AND STORAGE MEDIUM

(71) Applicant: SUZHOU METABRAIN INTELLIGENT TECHNOLOGY CO., LTD., Jiangsu (CN)

(72) Inventors: Xu Sun, Jiangsu (CN); Yulong Zhou, Jiangsu (CN); Gang Liu, Jiangsu (CN); Tuo Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/695,690

(22) PCT Filed: May 27, 2022

(86) PCT No.: PCT/CN2022/095467
§ 371 (c)(1),
(2) Date: Mar. 26, 2024

(87) PCT Pub. No.: WO2023/130653
PCT Pub. Date: Jul. 13, 2023

(30) Foreign Application Priority Data

Jan. 6, 2022 (CN) .......................... 202210007520.X (51) Int. Cl.
*G06K 9/36* (2006.01)
*H04N 19/119* (2014.01)
(Continued)

(52) U.S. Cl.
CPC ......... *H04N 19/625* (2014.11); *H04N 19/119* (2014.11); *H04N 19/136* (2014.11);
(Continued)

(58) Field of Classification Search
CPC .. H04N 19/625; H04N 19/119; H04N 19/136; H04N 19/182; H04N 19/186;
(Continued)

(56) References Cited

U.S. PATENT DOCUMENTS 7,233,623 B1  6/2007  Pau et al.
8,326,067 B2 * 12/2012  Furbeck ................. H04N 19/19
                                              382/250
(Continued)

FOREIGN PATENT DOCUMENTS

CN       103609117 A      2/2014
CN       106210715 A      12/2016
(Continued)

OTHER PUBLICATIONS

Corresponding International Patent Application No. PCT/CN2022/095467, International Search Report, Date Mailed Sep. 23, 2022.
(Continued)

*Primary Examiner* — Duy M Dang
(74) *Attorney, Agent, or Firm* — Cooper Legal Group, LLC (57) ABSTRACT

Provided are a data processing method and apparatus for image compression, a device, and a storage medium. The method comprises: segmenting an image to be compressed into a plurality of image matrices, and performing first matrix calculation on elements of the image matrices to obtain first intermediate matrices; configuring a storage space size and storage addresses of the first intermediate matrices according to the resolution and pixel component depth of the image to be compressed performing second matrix calculation on elements of the first intermediate matrices and elements of a preset conversion matrix to obtain second intermediate matrices, and performing third matrix calculation on elements of the second intermediate
(Continued)

matrices and the elements of the conversion matrix to obtain third intermediate matrices; and performing fourth matrix calculation on the conversion matrix and the third intermediate matrices to obtain result matrices, and encoding the result matrices to obtain a compressed image.

20 Claims, 5 Drawing Sheets

(51) Int. Cl.
   *H04N 19/136* (2014.01)
   *H04N 19/182* (2014.01)
   *H04N 19/186* (2014.01)
   *H04N 19/423* (2014.01)
   *H04N 19/625* (2014.01)

(52) U.S. Cl.
   CPC ......... *H04N 19/182* (2014.11); *H04N 19/186* (2014.11); *H04N 19/423* (2014.11)

(58) Field of Classification Search
   CPC ............... H04N 19/423; H04N 19/433; G06F 16/7864; G06T 9/007; G06T 9/00
   See application file for complete search history.

(56) References Cited

U.S. PATENT DOCUMENTS

| | | | |
|---|---|---|---|
| 2002/0031276 | A1 | 3/2002 | Yagishita et al. |
| 2004/0117418 | A1* | 6/2004 | Vainsencher ........... G06T 9/007 |
| | | | 708/402 |
| 2005/0069035 | A1 | 3/2005 | Lu et al. |

FOREIGN PATENT DOCUMENTS

| | | |
|---|---|---|
| CN | 107027039 A | 8/2017 |
| CN | 108717687 A | 10/2018 |
| CN | 112767503 A | 5/2021 |
| CN | 113554574 A | 10/2021 |
| CN | 114022580 A | 2/2022 |

OTHER PUBLICATIONS

Corresponding International Patent Application No. PCT/CN2022/089353, Written Opinion, Date Mailed Sep. 23, 2022.
Corresponding Chinese Patent Application No. CN202210007520.X, First Office Action, dated Feb. 24, 2022.
Corresponding Chinese Patent Application No. CN202210007520.X, Notification to Grant, dated Mar. 18, 2022.
Zhang Rui et., "Optimization of the measurement matrix based on SVD and Mutual Coherence Minimization", Theoretical Algorithm, Dec. 31, 2021, pp. 37-39, with English Abstract.

* cited by examiner

DATA PROCESSING METHOD AND APPARATUS FOR IMAGE COMPRESSION, DEVICE, AND STORAGE MEDIUM

CROSS-REFERENCE TO RELATED APPLICATION

This application claims priority to Chinese Patent Application No. 202210007520.X, filed on Jan. 6, 2022 in China National Intellectual Property Administration and entitled "Data Processing Method and Apparatus for Image Compression, Device, and Storage Medium", which is hereby incorporated by reference in its entirety.

FIELD

The present application relates to the field of image processing technology, in particular to a data processing method and apparatus for image compression, a device, and a storage medium.

BACKGROUND

With the development of the big data era, a large number of continuous tone static images need to be stored and transmitted. Therefore, the issue of how to improve the compression performance of high color fidelity images is being paid much attention. At present, an original image with a resolution expressed in a form of rows and columns is generally segmented into a plurality of small blocks by using a joint photographic experts group compression algorithm, then matrix calculation is performed by using a discrete cosine transform method to obtain frequency domain signals, and the original image is finally compressed.

However, the inventor realizes that the current discrete cosine transform method needs to read and cache all rows and columns of data, resulting in the problems of high resource consumption, low operational performance, and the like.

SUMMARY

One aspect of the present application provides a data processing method for image compression, including the following steps:
  segmenting an image to be compressed into a plurality of image matrices, and sequentially performing first matrix calculation on elements of the image matrices to obtain first intermediate matrices;
  configuring a storage space size according to the resolution and pixel component depth of the image to be compressed, configuring storage addresses of the first intermediate matrices according to the number of the first intermediate matrices, and storing the first intermediate matrices;
  reading the first intermediate matrices, performing second matrix calculation on elements of the first intermediate matrices and elements of a preset conversion matrix to obtain second intermediate matrices, and performing third matrix calculation on elements of the second intermediate matrices and the elements of the conversion matrix to obtain third intermediate matrices; and
  performing fourth matrix calculation on the conversion matrix and the third intermediate matrices to obtain result matrices, and encoding the result matrices to obtain a compressed image.

In some embodiment, the step of segmenting an image to be compressed into a plurality of image matrices, and sequentially performing first matrix calculation on elements of the image matrices includes:
  obtaining at least one color channel, and segmenting the image to be compressed into a plurality of image matrices of a preset matrix size in the color channel; and
  configuring the conversion matrix, and performing the first matrix calculation on one column of elements and another column of elements of the image matrices according to positive and negative values of the elements of the conversion matrix, where the conversion matrix is an orthogonal matrix, and the first matrix calculation includes an addition operation.

In some embodiment, the step of configuring a storage space size according to the resolution and pixel component depth of the image includes:
  according to the resolution and pixel component depth of the image, a mathematical expression for the storage space size being:

$$Space=(Res/Width)*((Pixel+1)*Width*Channel)$$

where Space is the storage space size, Res is the resolution, Pixel is the pixel component depth, Width is the size of the image matrices, Channel is the number of selected color channels, and the Res, Pixel, Width, and Channel are positive integers.

In some embodiment, the step of configuring storage addresses of the first intermediate matrices according to the number of the first intermediate matrices includes:
  according to the number and rows of the first intermediate matrices, a mathematical expression for the storage addresses being:

$$Addr=(M-1)*L\_max*Length+(L-1)*Length$$

where Addr is the storage address, M is a number index of the first intermediate matrix, L is a row index of the first intermediate matrix, L_max is a maximum number of rows of the first intermediate matrix, Length is a storage length occupied by each row of data in the first intermediate matrix, and the Addr, M, L, L_max, and Length are positive integers.

In some embodiment, the step of reading the first intermediate matrices, and performing second matrix calculation on elements of the first intermediate matrices and elements of a preset conversion matrix to obtain second intermediate matrices includes:
  performing a continuous read operation from a first address of the storage space to obtain the first intermediate matrices; and
  performing the second matrix calculation on the elements of the first intermediate matrices and the elements of the preset conversion matrix, and superposing calculation results to obtain the second intermediate matrices, where the second matrix calculation includes addition and multiplication operations.

In some embodiment, the step of performing third matrix calculation on elements of the second intermediate matrices and the elements of the conversion matrix to obtain third intermediate matrices includes:
  performing the third matrix calculation on the elements of the second intermediate matrices and the elements of the preset conversion matrix, and superposing calculation results to obtain the third intermediate matrices, where the third matrix calculation includes addition and multiplication operations.

In some embodiment, the step of performing fourth matrix calculation on the conversion matrix and the third intermediate matrices to obtain result matrices, and encoding the result matrices to obtain a compressed image includes:

multiplying and summing each row of elements of the conversion matrix with each column of elements of the third intermediate matrices sequentially to obtain the result matrices; and performing quantification, differential encoding, run length encoding, and Huffman encoding on the result matrices to select a compression ratio, so as to obtain the compressed image.

Another aspect of the present application further provides a data processing apparatus for image compression. The data processing apparatus for image compression includes:

a first matrix calculation module, configured to segment an image to be compressed into a plurality of image matrices, and sequentially perform first matrix calculation on elements of the image matrices to obtain first intermediate matrices;

a storage parameter configuration module, configured to configure a storage space size according to the resolution and pixel component depth of the image to be compressed, configure storage addresses of the first intermediate matrices according to the number of the first intermediate matrices, and store the first intermediate matrices;

an intermediate matrix obtaining module, configured to read the first intermediate matrices from a storage unit, perform second matrix calculation on elements of the first intermediate matrices and elements of a preset conversion matrix to obtain second intermediate matrices, and perform third matrix calculation on elements of the second intermediate matrices and the elements of the conversion matrix to obtain third intermediate matrices; and a result matrix obtaining module, configured to perform fourth matrix calculation on the conversion matrix and the third intermediate matrices to obtain result matrices, and encode the result matrices to obtain a compressed image.

Another aspect of the present application further provides a computer device, including a memory and one or more processors. The memory stores computer-readable instructions. When the computer-readable instructions are executed by the one or more processors, the one or more processors are enabled to perform the steps of the data processing method for image compression in any of the foregoing embodiments.

Another aspect of the present application further provides one or more non-volatile computer-readable storage media storing computer-readable instructions. When the computer-readable instructions are executed by one or more processors, the one or more processors are enabled to perform the steps of the data processing method for image compression in any of the foregoing embodiments.

Details of one or more embodiments of the present application are provided in accompanying drawings and descriptions below. Other features and advantages of the present application will become apparent from the description, accompanying drawings and claims.

BRIEF DESCRIPTION OF THE DRAWINGS

In order to describe the embodiments of the present application or the technical solutions in related technologies more clearly, drawings required to be used in the embodiments or the illustration of the related technologies will be briefly introduced below. Apparently, the drawings in the illustration below are only some embodiments of the present application. Those ordinarily skilled in the art also can obtain other drawings according to the provided drawings without creative work.

DETAILED DESCRIPTION

In order to make the objectives, technical solutions, and advantages of the present application clearer, the present application will be further described in detail below with reference to the accompanying drawings and embodiments. It is to be understood that the specific embodiments described herein are only used for explaining the present application, and are not used for limiting the present application.

Figure 1:
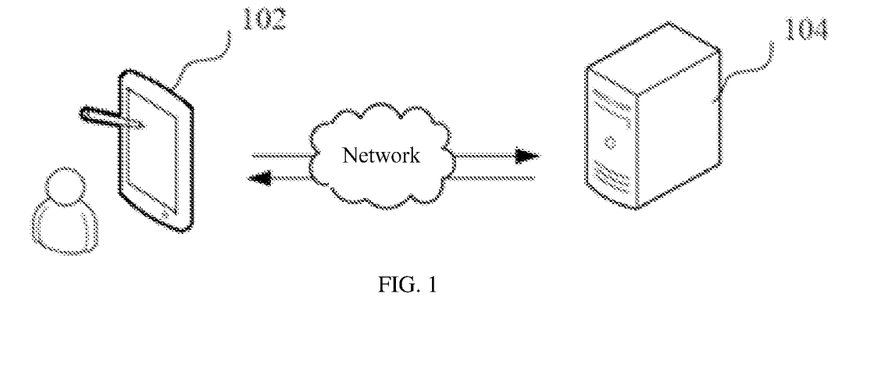
FIG. 1 is an application environment diagram of a data processing method for image compression in one or more embodiments.

A data processing method for image compression, provided in the present application, may be applied to an application environment shown in FIG. 1. A terminal 102 communicates with a server 104 through a network. For example, the data processing method for image compression, provided in the present application, may be applied to a DCT (Discrete Cosine Transform) calculation process in a JPEG (Joint Photographic Experts Group) image compression process, to improve the problems of high resource consumption of row cache units, complex matrix calculation, and the like in the original DCT process due to increased image resolution, where a matrix product operation in the DCT process is decomposed into addition and multiplication operations between some elements, first matrix calculation is performed on elements of image matrices to obtain first intermediate matrices for storage, second matrix calculation and third matrix calculation are performed on elements of a conversion matrix and elements of the first intermediate matrices to obtain third intermediate matrices, fourth matrix calculation is performed on the conversion matrix and the third matrices to obtain result matrices, and the result matrices are finally encoded to obtain a compressed image, thereby reducing resource consumption of the DCT process in image compression and improving operational performance. The method may also be applied to a chip design, where a corresponding hardware design is constructed according to a logical structure of the method to implement pipeline parallel calculations of the DCT process in the JPEG image compression process. The terminal 102 may be, but is not limited to, various personal computers, laptops, smart phones, tablets, portable wearable devices, or sub servers. The server 104 may be implemented by an independent server or a cluster of a plurality of servers or a cloud computing platform.

Figure 2:
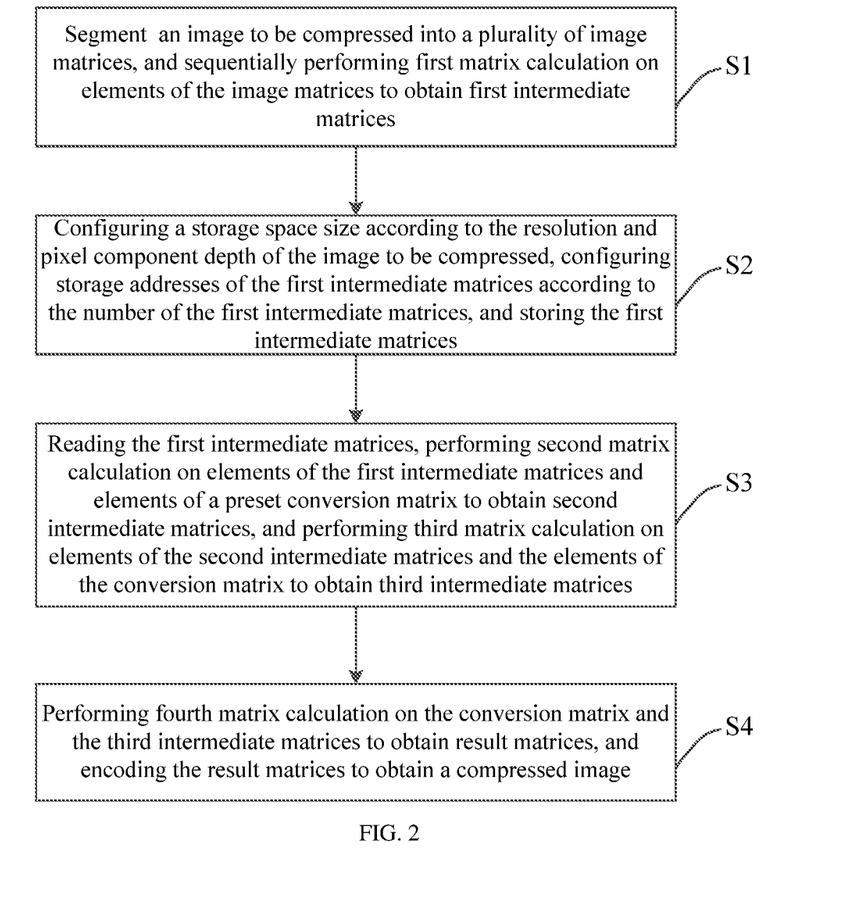
FIG. 2 is a schematic flowchart of a data processing method for image compression in one or more embodiments.

In some embodiment, as shown in FIG. 2, a data processing method for image compression is provided, including the following steps:

S1: segmenting an image to be compressed into a plurality of image matrices, and sequentially performing first matrix calculation on elements of the image matrices to obtain first intermediate matrices;

S2: configuring a storage space size according to the resolution and pixel component depth of the image to be compressed, configuring storage addresses of the first intermediate matrices according to the number of the first intermediate matrices, and storing the first intermediate matrices;

S3: reading the first intermediate matrices, performing second matrix calculation on elements of the first intermediate matrices and elements of a preset conversion matrix to obtain second intermediate matrices, and performing third matrix calculation on elements of the second intermediate matrices and the elements of the conversion matrix to obtain third intermediate matrices; and S4: performing fourth matrix calculation on the conversion matrix and the third intermediate matrices to obtain result matrices, and encoding the result matrices to obtain a compressed image.

Through the above steps, the problems of high resource consumption and high complexity of matrix product calculation in a DCT process when the resolution of an image to be compressed is relatively high in a JPEG image compression process may be improved. In the DCT process of JPEG image compression, the image to be compressed needs to be segmented into a plurality of image matrices, an orthogonal matrix needs to be configured as the conversion matrix, and then a matrix product operation is performed on the conversion matrix, the image matrices, and a transposed matrix of the conversion matrix. However, when the resolution of the image to be compressed is relatively high, the number of the image matrices is large, the matrix product calculation is complex, and the consumption of cache units is huge. Therefore, the matrix product operation in the DCT process is decomposed into addition and multiplication operations between some elements in parallel. The first matrix calculation is performed on the elements of the image matrices to obtain the first intermediate matrices, the storage space size and the storage addresses are configured, the first intermediate matrices are stored in a form of matrix blocks, then the second matrix calculation and third matrix calculation are performed on the elements of the conversion matrix and the elements of the first intermediate matrices to obtain the third intermediate matrices, the fourth matrix calculation is performed on the conversion matrix and the third intermediate matrices to obtain the result matrices, and the result matrices are finally encoded to obtain the compressed image, thereby reducing resource consumption of the DCT process in image compression and improving operational performance. Meanwhile, the method has good compatibility and superior performance when compressing images with higher resolutions and larger sizes in the future.

In order to reduce the resource consumption of cache units, only partial information of the image to be compressed is cached. In step S1, illustratively, the image to be compressed is segmented into a plurality of image matrices, and first matrix calculation is sequentially performed on the image matrices to obtain first intermediate matrices. For example, after the image to be compressed is obtained, elements of image matrices to be compressed are back-stepped by 128 in order to change original data from unsigned numbers to signed numbers. For example, when the original data is 0 to 225, the data becomes −128 to 127 after being back-stepped by 128. Then, an image matrix size is set, such as 8*8. When the resolution of the image to be compressed is not a multiple of the image matrix size after multiplying, empty element filling is performed on the image to be compressed. Starting from the first row and first column of element of the image to be compressed, the first to eighth rows and first to eighth columns of pixels are selected as a first image matrix, and the first to eighth rows and ninth to sixteenth columns of pixels are selected as a second image matrix until all pixels are selected to form a plurality of image matrices. Then, the first row and first column of data of the first image matrix is added to the first row and eighth column of data to form a first row and first column of element of a first intermediate matrix, the first row and second column of data of the first image matrix is added to the first row and seventh column of data to form a first row and second column of element of the first intermediate matrix until all rows and columns of data are added to obtain all elements of the first intermediate matrix and form the first intermediate matrix. The same processing is performed on remaining image matrices to obtain a plurality of first intermediate matrices, so as to store the first intermediate matrices subsequently and reduce a cache size and resource consumption.

In order to store the plurality of first intermediate matrices in a reasonable form, in step S2, illustratively, the storage space size and the storage addresses of the first intermediate matrices are configured, and each first intermediate matrix is stored, for example, the first intermediate matrix may be stored in a storage unit, such as a DDR (Double Data Rate RAM). The number of the first intermediate matrices is calculated according to the resolution of the image to be compressed and the size of the image matrices. For example, when the resolution of the image to be compressed is 1920*1080, the size of the image matrices is 8*8, and 1 color channel is selected, the number of the first intermediate matrices is 1920*1080/(8*8), namely, 32400. Since each first intermediate matrix includes 8*8=64 data, when the byte length occupied by each data is 2 bytes, the byte length occupied by all the first intermediate matrices is 32400*64*2=4147200 bytes, that is, the space size of the storage unit is configured to 4147200 bytes. After the space size of the storage unit is configured, each first intermediate matrix needs to be stored, so storage addresses need to be configured. For the $1^{st}$ row of data of the $1^{st}$ first matrix, its starting storage address is 0. For the $2^{nd}$ row of data of the $1^{st}$ first intermediate matrix, its starting storage address is 16. For the $3^{rd}$ row of data of the $1^{st}$ first intermediate matrix, its starting storage address is 32, until all rows of data of all the first intermediate matrices are allocated with storage addresses, whereby all the first intermediate matrices are stored in the storage unit according to the storage addresses, and the consumption of storage resources is reduced.

In order to calculate the first intermediate matrices and the conversion matrix to obtain intermediate results of DCT, in step S3, illustratively, the first intermediate matrices are read from the storage unit, and the second matrix calculation and the third matrix calculation are performed on the elements of the conversion matrix and the first intermediate matrices to obtain third intermediate matrices. For example, a continuous read operation is performed from the first address of the storage space to obtain the first intermediate matrices, the first intermediate matrices may be stored in a matrix cache unit, such as an in-chip cache of a system on chip, and then an orthogonal matrix is configured as the conversion matrix. Since the elements of the conversion matrix have positive and negative values, and some of the positive and negative values have the same absolute value, the positive and negative values having the same absolute value may serve as one group, namely, elements that are numerically opposite may serve as one group, or the same numerical elements in a row of the conversion matrix may serve as one group. For example, when the elements in the first row and all columns of the conversion matrix have the same value, the first row and first column of element, the first row and third column of element, the first row and fifth column of element, and the first row and seventh column of element of the first intermediate matrix are added as a first element of a second matrix. When the first column of element of the second row of data and the second row and eighth column of element of the conversion matrix are positive or negative numerical elements having the same absolute value, the first row and second column of element of the first intermediate matrix may be multiplied with the first column of element of the second row of data of the conversion matrix, as a second element of the second intermediate matrix. When the values of the second column of element of the second row of data and the second row and seventh column of element of the conversion matrix are opposite to each other, the first row and fourth column of element of the first intermediate matrix may be multiplied with the second column of element of the second row of data of the conversion matrix, as a third element of the second intermediate matrix. When the values of the third column of element of the second row of data and the second row and sixth column of element of the conversion matrix are opposite to each other, the first row and sixth column of element of the first intermediate matrix may be multiplied with the third column of element of the second row of data of the conversion matrix, as a fourth element of the second intermediate matrix. When the values of the fourth column of element of the second row of data and the second row and fifth column of element of the conversion matrix are opposite to each other, the first row and eighth column of element of the first intermediate matrix may be multiplied with the fourth column of element of the second row of data of the conversion matrix, as a fifth element of the second intermediate matrix. That is, by analyzing the distribution of elements of the conversion matrix, the elements having the same or opposite data among the first row and columns of elements of the conversion matrix serve as one group, and the elements of the first intermediate matrix are combined with the elements of the conversion matrix according to corresponding position information of the elements in the first intermediate matrix to form elements of the second intermediate matrix. Then, the first element of the second intermediate matrix is multiplied with the data in the first row and all columns of the conversion matrix, as a first element of the third intermediate matrix. The second, third, fourth, and fifth elements of the second matrix are added as a second element of the third matrix until all elements constituting the third intermediate matrix are calculated. In this way, the second matrix calculation and the third matrix calculation may be set as pipeline calculations, and the second matrix calculation and the third matrix calculation are parallel to improve operational performance.

In order to obtain result matrices and encode the result matrices to obtain a compressed image, in step S4, illustratively, the fourth matrix calculation is performed on the conversion matrix and the third intermediate matrices to obtain result matrices, and the result matrices are encoded to obtain a compressed image. For example, each element in the first row of the conversion matrix is correspondingly multiplied with each element in the first column of each third intermediate matrix and product results are summed as the first row and first column of element of a result matrix, each element in the first row of the conversion matrix is correspondingly multiplied with each element in the second column of the third intermediate matrix and product results are summed as the first row and second column of element of the result matrix, until each element in the first row is correspondingly multiplied with each element in the eighth column of the third intermediate matrix and product results are summed as the first row and eighth column of element of the result matrix. Then, each element in the second row of the conversion matrix is correspondingly multiplied with each element in the first column of the third intermediate matrix and product results are summed as the second row and first column of element of the result matrix, until the elements in all rows of the conversion matrix and the elements in all columns of the third intermediate matrix are multiplied and summed, and all elements constituting the result matrix are obtained, where the result matrix is a result of the DCT process in the JPEG image compression process. Finally, the result matrices are encoded to obtain a compressed image file.

Figure 3:
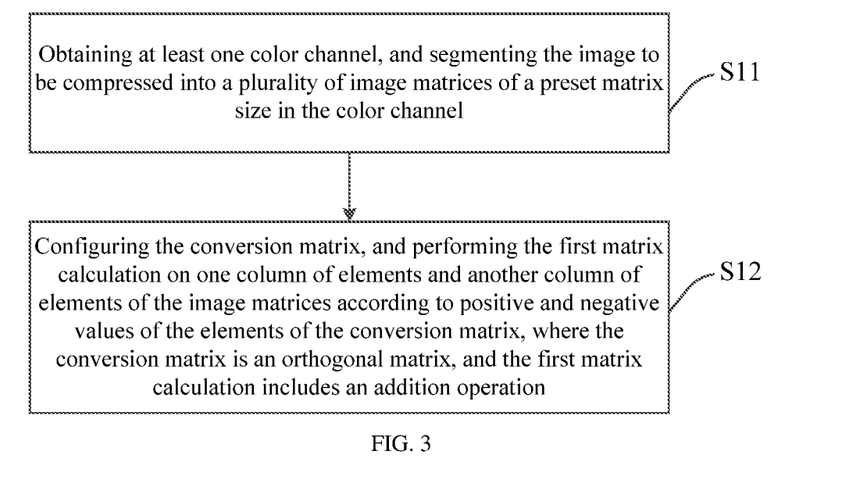
FIG. 3 is a schematic flowchart of first matrix calculation in one or more embodiments.

Before the first intermediate matrices are calculated, the image to be compressed needs to be segmented. As shown in FIG. 3, the step of segmenting an image to be compressed into a plurality of image matrices, and sequentially performing first matrix calculation on elements of the image matrices includes:

S11: obtaining at least one color channel, and segmenting the image to be compressed into a plurality of image matrices of a preset matrix size in the color channel; and S12: configuring the conversion matrix, and performing the first matrix calculation on one column of elements and another column of elements of the image matrices according to positive and negative values of the elements of the conversion matrix, where the conversion matrix is an orthogonal matrix, and the first matrix calculation includes an addition operation.

As shown in FIG. 3, in step S11, illustratively, for Y, Cb, and Cr color channels, at least one color channel is selected, for example, the Y channel may be selected, the matrix size of the image matrices may be configured as 8*8, and the image to be compressed is segmented into a plurality of 8*8 image matrices according to the resolution a*b of the image to be compressed. The number of the image matrices is calculated by (a*b)/(8*8). When the resolution of the image to be compressed is 1024*768, the number of the image matrices is 12288. When two color channels, such as Y channel and Cb channel, are selected, the number of the image matrices is 2*(a*b)/(8*8). When the resolution of the image to be compressed is 1024*768, the number of the image matrices is 24576. Starting from the first row and first column of element of the image to be compressed, pixels from the first to eighth rows and the first to eighth columns are selected as a first image matrix, and pixels from the first to eighth rows and the ninth to sixteenth columns are selected as a second image matrix until all pixels are selected to form a plurality of image matrices. In some implementation processes, Y, Cb, and Cr color channels may be selected, and the number of the image matrices is 3*(a*b)/(8*8). When the resolution of the image to be compressed is 1024*768, the number of the image matrices is 36864.

As shown in FIG. 3, in step S12, illustratively, an orthogonal matrix is configured as the conversion matrix, and the first intermediate matrices are calculated according to the positive and negative values of the elements of the conversion matrix. The element in the $i^{th}$ row and $j^{th}$ column of the conversion matrix is denoted as Cij, and the element in the $i^{th}$ row and $j^{th}$ column of the image matrices is denoted as Xij. For example, the data in the first row and first column and the data in the first row and eighth column of the first image matrix are added to form an element in the first row and first column of the first intermediate matrix, and then the data in the first row and second column and the data in the first row and seventh column of the first image matrix are added to form an element in the first row and second column of the first intermediate matrix, until the data in all rows and columns are added to obtain all elements of the first intermediate matrix and form the first intermediate matrix. In the addition process, when subtraction is required for the negative elements in the conversion matrix, the addition combined with negative numbers is used instead of the subtraction. For example, when the values of C11, C12, C13, C14, C15, C16, C17, and C18 are equal and positive, a mathematical expression for multiplying and summing the elements in the first row and all columns of the image matrix with the elements in the first column and all rows of the transposed matrix of the conversion matrix is:

$$X11*C11+X12*C12+X13*C13+X14*C14+X15*C15+X16*C16+X17*C17+X18*C18$$

The above expression may be transformed into:

$$(X11+X18)*C11+(X12+X17)*C12+(X13+X16)*C13+(X14+X15)*C14$$

When C21, C22, C23, and C24 are positive, C25, C26, C27, and C28 are negative, and C21=−C28, C22=−C27, C23=−C26, C24=−C25, that is, a mathematical expression for multiplying and summing the elements in the first row and all columns of the image matrix with the elements in the second column and all rows of the transposed matrix of the conversion matrix is:

$$X11*C21+X12*C22+X13*C23+X14*C24+X15*C25+X16*C26+X17*C27+X18*C28$$

The above expression may be transformed into:

$$(X11-X18)*C21+(X12-X17)*C22+(X13-X16)*C23+(X14-X15)*C24$$

(X11+X18) serves as an element in the first row and first column of the first intermediate matrix, (X11−X18) serves as an element in the first row and second column of the first intermediate matrix, (X12+X17) serves as an element in the first row and third column of the first intermediate matrix, (X12−X17) serves as an element in the first row and fourth column of the first intermediate matrix, (X13+X16) serves as an element in the first row and fifth column of the first intermediate matrix, (X13−X16) serves as an element in the first row and sixth column of the first intermediate matrix, (X14+X15) serves as an element in the first row and seventh column of the first intermediate matrix, and (X14−X15) serves as an element in the first row and eighth column of the first intermediate matrix. Following the above pattern, (X21+X28) serves as an element in the second row and first column of the first intermediate matrix, (X21−X28) serves as an element in the second row and second column of the first intermediate matrix, (X22+X27) serves as an element in the second row and third column of the first intermediate matrix, (X22−X27) serves as an element in the second row and fourth column of the first intermediate matrix, (X23+X26) serves as an element in the second row and fifth column of the first intermediate matrix, (X23−X26) serves as an element in the second row and sixth column of the first intermediate matrix, (X24+X25) serves as an element in the second row and seventh column of the first intermediate matrix, and (X24-X25) serves as an element in the second row and eighth column of the first intermediate matrix. That is, (Xi1+Xi8) serves as an element in the $i^{th}$ row and first column of the first intermediate matrix, (Xi1−Xi8) serves as an element in the $i^{th}$ row and second column of the first intermediate matrix, (Xi2+Xi7) serves as an element in the $i^{th}$ row and third column of the first intermediate matrix, (Xi2−Xi7) serves as an element in the $i^{th}$ row and fourth column of the first intermediate matrix, (Xi3+Xi6) serves as an element in the $i^{th}$ row and fifth column of the first intermediate matrix, (Xi3−Xi6) serves as an element in the $i^{th}$ row and sixth column of the first intermediate matrix, (Xi4+Xi5) serves as an element in the $i^{th}$ row and seventh column of the first intermediate matrix, and (Xi4−Xi5) serves as an element in the $i^{th}$ row and eighth column of the first intermediate matrix, until elements in all rows and all columns that constitute the first intermediate matrix are obtained. Then, the same processing is performed on the remaining image matrix to obtain a plurality of first intermediate matrices, so as to store the first intermediate matrices subsequently and reduce the cache size and resource consumption.

Figure 4:
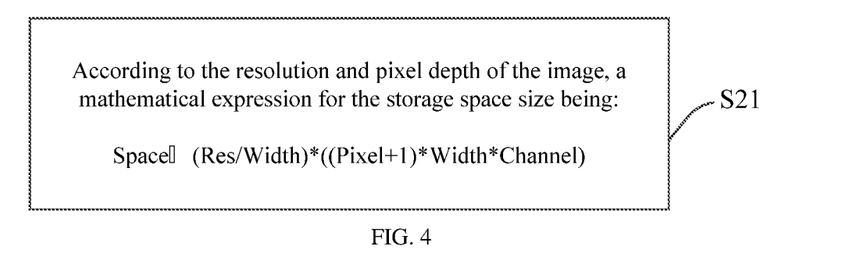
FIG. 4 is a schematic flowchart of configuring a storage space size in one or more embodiments.

After the plurality of first intermediate matrices are obtained, the first intermediate matrices need to be stored, that is, a storage space size needs to be configured. As shown in FIG. 4, in some embodiments, the step of configuring a storage space size according to the resolution and pixel component depth of the image includes:

S21: according to the resolution and pixel component depth of the image, a mathematical expression for the storage space size being:

Space=(Res/Width)*((Pixel+1)*Width*Channel)

where Space is the storage space size, Res is the resolution, Pixel is the pixel component depth, Width is the size of the image matrices, Channel is the number of selected color channels, and the Res, Pixel, Width, and Channel are positive integers.

As shown in FIG. 4, in step S21, illustratively, the space size of the storage unit is calculated according to the resolution and pixel component depth of the image. For example, when the resolution Res of the image to be compressed is 1024*768, the size Width of the image matrices is 8*8, the pixel component depth Pixel is 1 byte, and the number of selected color channels is 1, the space size Space of the storage unit is (1024*768/(8*8))*(1+1)*8*8*1)=1572864 bytes. In some implementation processes, when the number of selected color channels is 3, the space size Space of the storage unit is 4718592 bytes. The storage unit includes an off-chip cache of a system on chip.

Figure 5:
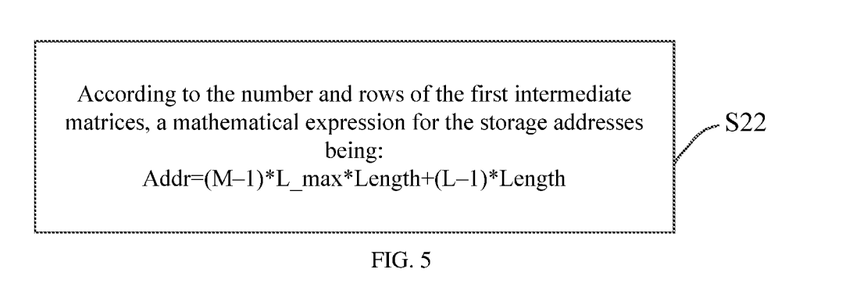
FIG. 5 is a schematic flowchart of configuring storage addresses of first intermediate matrices in one or more embodiments.

After the storage space size is obtained, the plurality of first intermediate matrices need to be stored in the storage unit according to appropriate positions. As shown in FIG. 5. The step of configuring storage addresses of the first intermediate matrices according to the number of the first intermediate matrices includes:

S22: according to the number and rows of the first intermediate matrices, a mathematical expression for the storage addresses being:

$$Addr=(M-1)*L\_max*Length+(L-1)*Length$$

where Addr is the storage address, M is a number index of the first intermediate matrix, L is a row index of the first intermediate matrix, L_max is a maximum number of rows of the first intermediate matrix, Length is a storage length occupied by each row of data in the first intermediate matrix, and the Addr, M, L, L_max, and Length are positive integers.

As shown in FIG. 5, in step S22, illustratively, the storage addresses of the first intermediate matrices are calculated according to the number and rows of the first intermediate matrices. For example, the Length may be set to 16 bytes. For the first row of the first one of the first intermediate matrices, M=1, L=1, and its storage address Addr is 0, that is, the storage address of the first row of the first one of the first intermediate matrices is byte 0 to byte 15. For the second row of the first one of the first intermediate matrices, M=1, L=2, and its storage address Addr is 16, that is, the storage address of the second row of the first one of the first intermediate matrices is byte 16 to byte 31. In some implementation processes, a plurality of color channels may be selected, and it is assumed that J represents a number index of a color channel and Addr_J represents a storage address of a first intermediate matrix of the color channel corresponding to the number index, whereby each row of each first intermediate matrix may be stored in order of the color channels. For example, Y and Cb color channels are selected, the storage address Addr_1 of the first row of elements of the first intermediate matrix of the first color channel Y is byte 0 to byte 15, the storage address Addr_2 of the first row of elements of the first intermediate matrix of the second color channel Cb is byte 16 to byte 31, the storage address Addr_1 of the second row of elements of the first intermediate matrix of the first color channel Y is byte 32 to byte 47, and the storage address Addr_2 of the second row of elements of the first intermediate matrix of the second color channel Cb is byte 48 to byte 63, until storage addresses of all color channels in all rows of all the first intermediate matrices are allocated, and all the first intermediate matrices are stored in the storage unit according to the allocated storage addresses.

In other implementation processes, each first intermediate matrix may be stored in order of color channels. That is, for each intermediate matrix, all its rows are continuously stored under one color channel and then continuously stored in another color channel. For example, two color channels Y and Cb are selected, the storage address Addr_1 of the first row of elements of the first intermediate matrix of the first color channel Y is byte 0 to byte 15, the storage address Addr_1 of the second row of elements of the first intermediate matrix is byte 16 to byte 31, and the storage address Addr_1 of the eighth row of elements of the first intermediate matrix is byte 112 to byte 127; the storage address Addr_2 of the first row of elements of the first intermediate matrix of the second color channel Cb is byte 128 to byte 143, the storage address Addr_2 of the second row of elements of the first intermediate matrix of the second color channel Cb is byte 144 to byte 159, the storage address Addr_2 of the eighth row of elements of the first intermediate matrix of the second color channel Cb is byte 240 to byte 255, until storage addresses of all color channels in all rows of all the first intermediate matrices are allocated, and all the first intermediate matrices are stored in the storage unit according to the allocated storage addresses.

In other implementation processes, all the first intermediate matrices may be stored in order of color channels. That is, all the first intermediate matrices are continuously stored in one color channel and then continuously stored in another color channel until all the first intermediate matrices are stored at intervals of the color channels.

Figure 6:
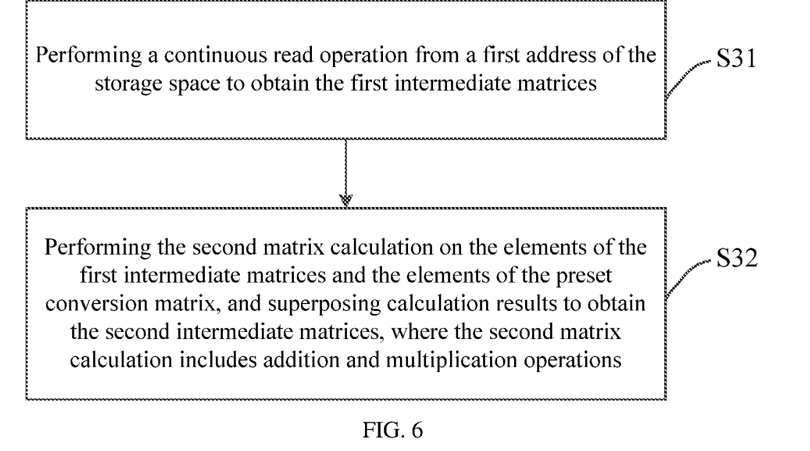
FIG. 6 is a schematic flowchart of obtaining second intermediate matrices in one or more embodiments.

After all the first intermediate matrices are stored in the storage unit, the first intermediate matrices need to be calculated with the conversion matrix to obtain second intermediate matrices. As shown in FIG. 6, the step of reading the first intermediate matrices, and performing second matrix calculation on elements of the first intermediate matrices and elements of a preset conversion matrix to obtain second intermediate matrices includes:

S31: performing a continuous read operation from a first address of the storage space to obtain the first intermediate matrices; and S32: performing the second matrix calculation on the elements of the first intermediate matrices and the elements of the preset conversion matrix, and superposing calculation results to obtain the second intermediate matrices, where the second matrix calculation includes addition and multiplication operations.

Through the above steps, the second matrix calculation may be performed on the first intermediate matrices and the conversion matrix to obtain the second intermediate matrices, whereby the original matrix multiplication operation is decomposed into addition and multiplication operations of some elements to reduce calculation.

As shown in FIG. 6, in step S31, illustratively, a continuous read operation is performed from the first address of the storage unit to obtain the first intermediate matrices. For example, when one color channel is selected, the read is directly performed from address 0 to sequentially obtain the first row of elements of the first one of the first intermediate matrices, with each interval of 16 bytes being another row of elements, until all rows of elements are obtained. Then all rows of elements of another first intermediate matrix are read until all rows of elements of all the first intermediate matrices are obtained. In other implementation processes, data may be read for two color channels. In cases of interval storage according to each row of the first intermediate matrices for different color channels, each row of elements of different first intermediate matrices of different color channels is read according to interval information, that is, the first row of elements of the first intermediate matrix of the first color channel is first obtained, then the first row of elements of the first intermediate matrix of the second color channel is obtained, the second row of elements of the first intermediate matrix of the first color channel is obtained, and the second row of elements of the first intermediate matrix of the second color channel is obtained, until all rows of elements of all the first intermediate matrices of all the color channels are obtained. In other implementation processes, in cases of interval storage according to each first intermediate matrix for different color channels, elements of different first intermediate matrices of different color channels are read according to interval information, that is, all rows of elements of the first intermediate matrix of the first color channel are first obtained, and then all rows of elements of the first intermediate matrix of the second color channel are obtained, until all rows of elements of all the first intermediate matrices of all the color channels are obtained, whereby the read efficiency is high. Especially for a large-capacity cache unit, such as DDR, which supports reading in a burst manner, namely, a range of continuous read addresses, the read efficiency is much higher than that of reading a single data. In this case, the data in the cache can be read in a burst manner.

As shown in FIG. 6, in step S32, illustratively, second matrix calculation is performed on the elements of the first intermediate matrices and the elements of the preset conversion matrix, and the calculation results are superimposed to obtain second intermediate matrices, where the second matrix calculation includes addition and multiplication operations. For example, a continuous read operation is performed from the first address of the storage space to obtain the first intermediate matrices. An orthogonal matrix is configured as the conversion matrix. Since the elements of the conversion matrix have positive and negative values, and some of the positive and negative values have the same absolute value, namely, are opposite to each other, the positive and negative values having the same absolute value may serve as one group, that is, elements that are numerically opposite may serve as one group, or the same numerical elements in a row of the conversion matrix may serve as one group. For example, when the elements in the first row and all columns of the conversion matrix have the same value, the first row and first column of element, the first row and third column of element, the first row and fifth column of element, and the first row and seventh column of element of the first intermediate matrix are added as a first element of a second intermediate matrix. When the first column of element of the second row of data and the second row and eighth column of element of the conversion matrix are positive or negative numerical elements having the same absolute value, the first row and second column of element of the first intermediate matrix may be multiplied with the first column of element of the second row of data of the conversion matrix, as a second element of the second intermediate matrix. When the values of the second column of element of the second row of data and the second row and seventh column of element of the conversion matrix are opposite to each other, the first row and fourth column of element of the first intermediate matrix may be multiplied with the second column of element of the second row of data of the conversion matrix, as a third element of the second intermediate matrix. When the values of the third column of element of the second row of data and the second row and sixth column of element of the conversion matrix are opposite to each other, the first row and sixth column of element of the first intermediate matrix may be multiplied with the third column of element of the second row of data of the conversion matrix, as a fourth element of the second intermediate matrix. When the values of the fourth column of element of the second row of data and the second row and fifth column of element of the conversion matrix are opposite to each other, the first row and eighth column of element of the first intermediate matrix may be multiplied with the fourth column of element of the second row of data of the conversion matrix, as a fifth element of the second intermediate matrix. Further, the element in the $i^{th}$ row and $j^{th}$ column of the first intermediate matrix is assumed as Pij, and the element in the $i^{th}$ row and $j^{th}$ column of the conversion matrix is assumed as Cij. When C31=C38, C32=C37, C33=C36, C34=C35, C31=−C34, and C32=−C33, (C31+C38)−(C34+C35) may serve as a combination, corresponding to a first intermediate matrix represented as P11-P17. Similarly, (C32+C37)−(C34+C36) may serve as a combination, corresponding to a first intermediate matrix represented as P13-P15. (P11-P17) serves as a sixth element of the second intermediate matrix, and (P13-P15) serves as a seventh element of the second intermediate matrix. That is, by analyzing the distribution of elements of the conversion matrix, the elements having the same or opposite data among the first row and columns of elements of the conversion matrix serve as one group, and the elements of the first intermediate matrix are combined with the elements of the conversion matrix according to corresponding position information of the elements in the first intermediate matrix to form elements of the second intermediate matrix. The subtraction in the above process may be replaced with addition of negative numbers, and the negative numbers are used for complementing positive numbers in the process.

Figure 7:
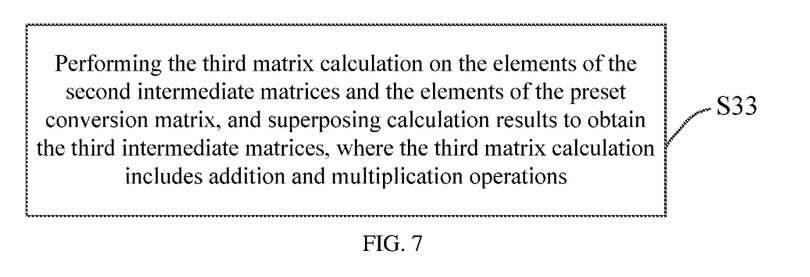
FIG. 7 is a schematic flowchart of obtaining third intermediate matrices in one or more embodiments.

After the second intermediate matrices are obtained, the conversion matrix needs to be continuously calculated to obtain third intermediate matrices. As shown in FIG. 7, the step of performing third matrix calculation on elements of the second intermediate matrices and the elements of the conversion matrix to obtain third intermediate matrices includes:

S33: performing the third matrix calculation on the elements of the second intermediate matrices and the elements of the preset conversion matrix, and superposing calculation results to obtain the third intermediate matrices, where the third matrix calculation includes addition and multiplication operations.

Through the above steps, the third matrix calculation is performed on the elements of the second intermediate matrices and the elements of the conversion matrix to obtain the third intermediate matrices, whereby the original matrix product calculation is decomposed into addition and multiplication operations of some elements.

As shown in FIG. 7, in step S33, illustratively, the third matrix calculation is performed on the elements of the second intermediate matrices and the elements of the conversion matrix to obtain the third intermediate matrices. For example, the first element of the second intermediate matrix is multiplied by the data in the first row and all columns of the conversion matrix as a first element of the third intermediate matrix, namely, a first row and first column of element of the third intermediate matrix. The second element, third element, fourth element, and fifth element of the second intermediate matrix are added as a second element of the third intermediate matrix, namely, a first row and second column of element of the third intermediate matrix.

Further, it may be assumed that the element in the $i^{th}$ row and $j^{th}$ column of the conversion matrix is Cij, the element in the $i^{th}$ row and $j^{th}$ column of the third intermediate matrix is Tij, and the $k^{th}$ element of the second intermediate matrix is Rk. T13=R6*C31+R7*C32, T14=R8+R9+R10+R11, T15=R12*C51, T16=R13+R14+R15+R16, T17=R17*C71+R18*C73, T18=R19+R20+R21+R22, and then the second and third rows of elements of the third intermediate matrix are continuously calculated in sequence until all elements constituting the third intermediate matrix are calculated.

Figure 8:
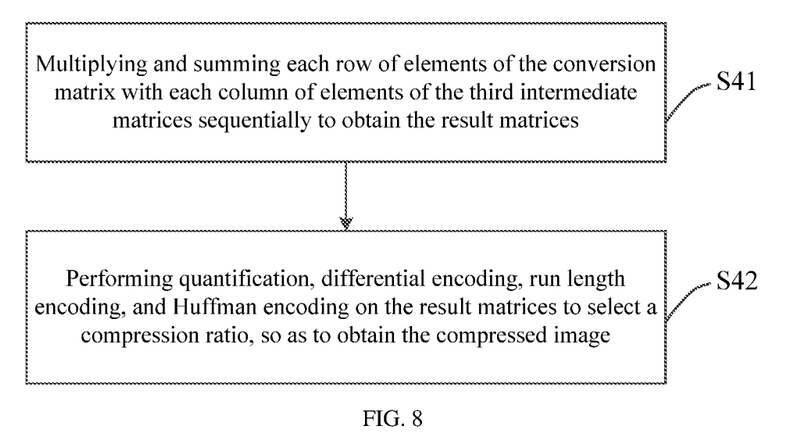
FIG. 8 is a schematic flowchart of obtaining result matrices in one or more embodiments.

After the third intermediate matrices are obtained, the fourth matrix calculation needs to be performed on the conversion matrix and the third intermediate matrices to obtain the result matrices, so as to obtain the compressed image. As shown in FIG. 8, the step of performing fourth matrix calculation on the conversion matrix and the third intermediate matrices to obtain result matrices, and encoding the result matrices to obtain a compressed image includes:

S41: multiplying and summing each row of elements of the conversion matrix with each column of elements of the third intermediate matrices sequentially to obtain the result matrices; and performing quantification, differential encoding, run length encoding, and Huffman encoding on the result matrices to select a compression ratio, so as to obtain the compressed image.

Through the above steps, the matrix product operation in the DCT process can be completed.

As shown in FIG. 8, in step S41, illustratively, each row of elements of the conversion matrix is multiplied and summed with each column of elements of the third intermediate matrices to obtain result matrices. For example, it is assumed that the element in the $i^{th}$ row and $j^{th}$ column of the conversion matrix is Cij, the element in the $i^{th}$ row and $j^{th}$ column of the third intermediate matrix is Tij, and the element in the $i^{th}$ row and $j^{th}$ column of the result matrix is Yij. The element in the $i^{th}$ row and $j^{th}$ column of the result matrix is:

As shown in FIG. 8, in step S42, illustratively, the result matrices are encoded to obtain a compressed image. For example, the result matrices are quantified to select quantified coefficient matrices. It is assumed that the element in the $i^{th}$ row and $j^{th}$ column of the quantified coefficient matrix is Qij, and the element in the $i^{th}$ row and $j^{th}$ column of the result matrix is Yij. A mathematical expression of the element in the $i^{th}$ row and $j^{th}$ column of the quantified result matrix is:

$$B_{ij}=\text{round}(Y_{ij}/Q_{ij})$$

where round (•) is a rounding function.

When the size of the result matrices is 8*8, the element in the top left corner of the quantified matrix, namely, in the first row and first column, is called a direct component, and the other 63 elements are called alternating components, where the direct component is differentially encoded with a direct coefficient of the previous matrix, and the alternating component is scanned in a zigzag pattern and encoded by a run length. Then, the direct components and the alternating components are encoded using different Huffman encoding tables according to different color channels, and a compression ratio is finally selected to obtain a compressed image file.

Figure 9:
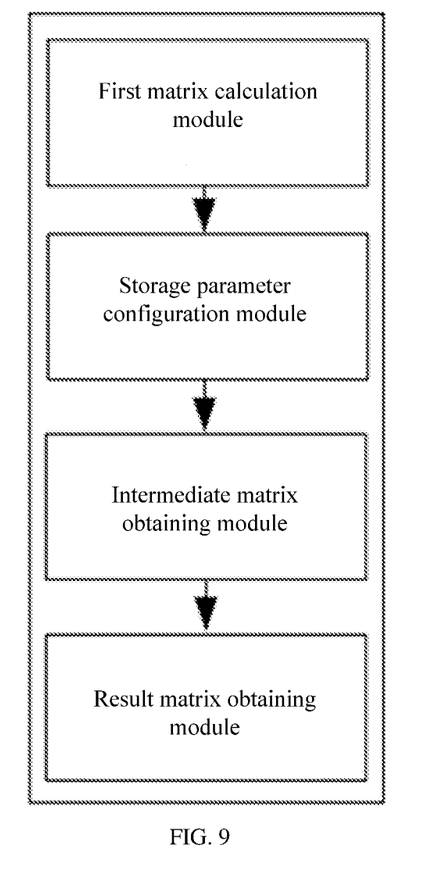
FIG. 9 is a structural block diagram of a data processing apparatus for image compression in one or more embodiments.

In some embodiment, as shown in FIG. 9, a data processing apparatus for image compression is provided. The data processing apparatus for image compression includes:

a first matrix calculation module, configured to segment an image to be compressed into a plurality of image matrices, and sequentially perform first matrix calculation on elements of the image matrices to obtain first intermediate matrices;

a storage parameter configuration module, configured to configure a storage space size according to the resolution and pixel component depth of the image to be compressed, configure storage addresses of the first intermediate matrices according to the number of the first intermediate matrices, and store the first intermediate matrices;

an intermediate matrix obtaining module, configured to read the first intermediate matrices, perform second matrix calculation on elements of the first intermediate matrices and elements of a preset conversion matrix to obtain second intermediate matrices, and perform third matrix calculation on elements of the second intermediate matrices and the elements of the conversion matrix to obtain third intermediate matrices; and a result matrix obtaining module, configured to perform fourth matrix calculation on the conversion matrix and the third intermediate matrices to obtain result matrices, and encode the result matrices to obtain a compressed image.

In the first matrix calculation module, illustratively, the image to be compressed is segmented into a plurality of image matrices, and the first matrix calculation is sequentially performed on the image matrices to obtain first intermediate matrices. For example, after the image to be compressed is obtained, elements of image matrices to be compressed are back-stepped by 128 in order to change original data from unsigned numbers to signed numbers. For example, when the original data is 0 to 225, the data becomes −128 to 127 after being back-stepped by 128. An image matrix size is set, such as 8*8. Starting from the first row and first column of element of the image to be compressed, the first to eighth rows and first to eighth columns of pixels are selected as a first image matrix, and the first to eighth rows and ninth to sixteenth columns of pixels are selected as a second image matrix until all pixels are selected to form a plurality of image matrices. Then, the first row and first column of data of the first image matrix is added to the first row and eighth column of data to form a first row and first column of element of a first intermediate matrix, the first row and second column of data of the first image matrix is added to the first row and seventh column of data to form a first row and second column of element of the first intermediate matrix until all rows and columns of data are added to obtain all elements of the first intermediate matrix and form the first intermediate matrix. The same processing is performed on remaining image matrices to obtain a plurality of first intermediate matrices, so as to store the first intermediate matrices subsequently and reduce a cache size and resource consumption. Further, one Y color channel may be selected, and the image to be compressed is segmented into a plurality of 8*8 image matrices according to the resolution a*b of the image to be compressed. The number of the image matrices is calculated by (a*b)/(8*8). When the resolution of the image to be compressed is 1024*768, the number of the image matrices is 12288. When two color channels, such as Y channel and Cb channel, are selected, the number of the image matrices is 2*(a*b)/(8*8). When the resolution of the image to be compressed is 1024*768, the number of the image matrices is 24576. When three color channels, such as Y, Cb, and Cr color channels, are selected, the number of the image matrices is 3*(a*b)/(8*8). When the resolution of the image to be compressed is 1024*768, the number of the image matrices is 36864. Starting from the first row and first column of element of the image to be compressed, pixels from the first to eighth rows and the first to eighth columns are selected as a first image matrix, and pixels from the first to eighth rows and the ninth to sixteenth columns are selected as a second image matrix until all pixels are selected to form a plurality of image matrices.

In the storage parameter configuration module, illustratively, the space size of a storage unit and the storage addresses of the first intermediate matrices are configured, and each first intermediate matrix is stored in the storage unit, where the storage unit includes an off-chip cache of a system on chip. For example, the number of the first intermediate matrices is calculated according to the resolution of the image to be compressed and the size of the image matrices. For example, when the resolution of the image to be compressed is 1920*1080, the size of the image matrices is 8*8, and 1 color channel is selected, the number of the first intermediate matrices is 1920*1080/(8*8), namely, 32400. Since each first intermediate matrix includes 8*8=64 data, when the byte length occupied by each data is 2 bytes, the byte length occupied by all the first intermediate matrices is 32400*64*2=4147200 bytes, that is, the space size of the storage unit is configured to 4147200 bytes;

Further, the byte length occupied by each data may be determined by the pixel component depth of the image. When the pixel component depth is Pixel bytes, the byte length occupied by each data is (Pixel+1) bytes. When Y, Cb, and Cr color channels are selected and Pixel is 1, the byte length occupied by all the first intermediate matrices is 32400*64*2*3=12441600 bytes. After the space size of the storage unit is configured, each first intermediate matrix needs to be stored, so storage addresses need to be configured. For the $1^{st}$ row of data of the $1^{st}$ first matrix, its starting storage address is 0. For the $2^{nd}$ row of data of the $1^{st}$ first intermediate matrix, its starting storage address is 16. For the $3^{rd}$ row of data of the $1^{st}$ first intermediate matrix, its starting storage address is 32, until all rows of data of all the first intermediate matrices are allocated with storage addresses, whereby all the first intermediate matrices are stored in the storage unit according to the storage addresses. In a case of a plurality of color channels, each row of the first intermediate matrices may be used as an interval to store elements of each row in each color channel at row intervals, or a complete intermediate matrix may be used as an interval to store elements in each color channel with the first intermediate matrix as an interval. In other implementation processes, all the first intermediate matrices may be stored in order of color channels. That is, all the first intermediate matrices are continuously stored in one color channel and then continuously stored in another color channel until all the first intermediate matrices are stored at intervals of the color channels.

In the intermediate matrix obtaining module, illustratively, the first intermediate matrices are read from the storage unit, and the second matrix calculation and the third matrix calculation are performed on the elements of the conversion matrix and the first intermediate matrices to obtain third intermediate matrices. For example, a continuous read operation is performed from the first address of the storage space to obtain the first intermediate matrices, the first intermediate matrices are stored in a small-capacity in-chip cache of a system on chip, and an orthogonal matrix is configured as the conversion matrix. Since the elements of the conversion matrix have positive and negative values, and some of the positive and negative values have the same absolute value, the positive and negative values having the same absolute value may serve as one group, namely, elements that are numerically opposite may serve as one group, or the same numerical elements in a row of the conversion matrix may serve as one group. For example, when the elements in the first row and all columns of the conversion matrix have the same value, the first row and first column of element, the first row and third column of element, the first row and fifth column of element, and the first row and seventh column of element of the first intermediate matrix are added as a first element of a second intermediate matrix. When the first column of element of the second row of data and the second row and eighth column of element of the conversion matrix are positive or negative numerical elements having the same absolute value, the first row and second column of element of the first intermediate matrix may be multiplied with the first column of element of the second row of data of the conversion matrix, as a second element of the second intermediate matrix. When the values of the second column of element of the second row of data and the second row and seventh column of element of the conversion matrix are opposite to each other, the first row and fourth column of element of the first intermediate matrix may be multiplied with the second column of element of the second row of data of the conversion matrix, as a third element of the second intermediate matrix. When the values of the third column of element of the second row of data and the second row and sixth column of element of the conversion matrix are opposite to each other, the first row and sixth column of element of the first intermediate matrix may be multiplied with the third column of element of the second row of data of the conversion matrix, as a fourth element of the second intermediate matrix. When the values of the fourth column of element of the second row of data and the second row and fifth column of element of the conversion matrix are opposite to each other, the first row and eighth column of element of the first intermediate matrix may be multiplied with the fourth column of element of the second row of data of the conversion matrix, as a fifth element of the second intermediate matrix. That is, by analyzing the distribution of elements of the conversion matrix, the elements having the same or opposite data among the first row and columns of elements of the conversion matrix serve as one group, and the elements of the first intermediate matrix are combined with the elements of the conversion matrix according to corresponding position information of the elements in the first intermediate matrix to form elements of the second intermediate matrix. Then, the first element of the second intermediate matrix is multiplied with the data in the first row and all columns of the conversion matrix, as a first element of the third intermediate matrix. The second, third, fourth, and fifth elements of the second intermediate matrix are added as a second element of the third intermediate matrix until all elements constituting the third intermediate matrix are calculated.

In the result matrix obtaining module, illustratively, the fourth matrix calculation is performed on the conversion matrix and the third intermediate matrices to obtain result matrices, and the result matrices are encoded to obtain a compressed image. For example, each element in the first row of the conversion matrix is correspondingly multiplied with each element in the first column of each third intermediate matrix and product results are summed as the first row and first column of element of a result matrix, each element in the first row of the conversion matrix is correspondingly multiplied with each element in the second column of the third intermediate matrix and product results are summed as the first row and second column of element of the result matrix, until each element in the first row is correspondingly multiplied with each element in the eighth column of the third intermediate matrix and product results are summed as the first row and eighth column of element of the result matrix. Then, each element in the second row of the conversion matrix is correspondingly multiplied with each element in the first column of the third intermediate matrix and product results are summed as the second row and first column of element of the result matrix, until the elements in all rows of the conversion matrix and the elements in all columns of the third intermediate matrix are multiplied and summed, and all elements constituting the result matrix are obtained, where the result matrix is a result of the DCT process in the JPEG image compression process. Finally, operations such as encoding, selection of a compression ratio are performed on the result matrices to obtain a compressed image file.

Specific definitions on the data processing apparatus for image compression may be referenced to the previous definitions on the data processing method for image compression, and will not be repeated here. The foregoing modules in the data processing apparatus for image compression may be implemented entirely or partially through software, hardware, or a combination thereof. The foregoing modules may be embedded in or independent of a processor in a computer device in a form of hardware, or stored in a memory of a computer device in a form of software, whereby the processor calls the modules to perform operations corresponding to the modules.

Figure 10:
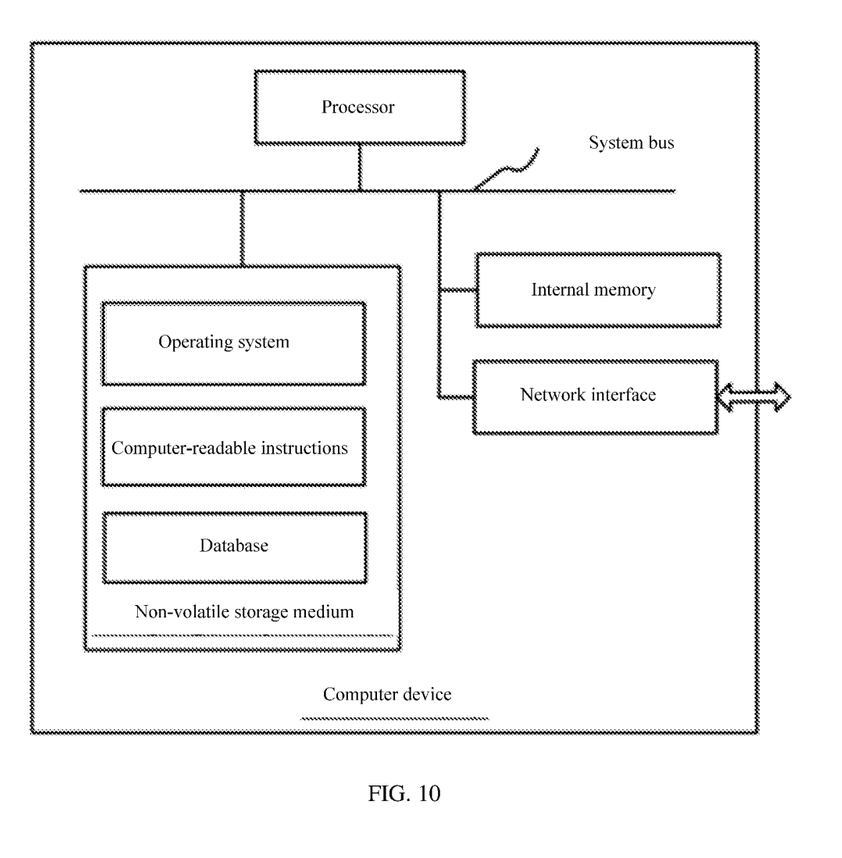
FIG. 10 is an internal structure diagram of a computer device in one or more embodiments.

In an embodiment, a computer device is provided, the computer device may be a server, and an internal structure of the computer device may be shown as FIG. 10. The computer device includes a processor, a memory, a network interface and a database connected by a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store processing data for image compression. The network interface of the computer device is configured to communicate with an external terminal through a network connection. The computer-readable instructions are executed by the processor to implement the data processing method for image compression.

Those skilled in the art can understand that the structure shown in FIG. 10 is only a block diagram of a partial structure related to the solution of the present application, and does not constitute a limitation on the computer device to which the solution of the present application is applied. The specific computer device may include more or fewer parts than shown in the figure, or combine some parts, or have a different arrangement of parts.

In some embodiment, a computer device is provided, including a memory and one or more processors. The memory stores computer-readable instructions. When the computer-readable instructions are executed by the one or more processors, the one or more processors are enabled to perform the steps of the data processing method for image compression in any of the foregoing embodiments.

In some embodiment, one or more non-volatile computer-readable storage media storing computer-readable instructions are provided. When the computer-readable instructions are executed by one or more processors, the one or more processors are enabled to perform the steps of the data processing method for image compression in any of the foregoing embodiments.

Those of ordinary skill in the art can understand that all or some of the processes in the methods of the foregoing embodiments can be implemented by instructing relevant hardware through computer-readable instructions. The computer-readable instructions may be stored in a non-volatile computer-readable storage medium, and when executed, the computer-readable instructions may include processes as described in the embodiments of the foregoing methods. Any reference to the memory, storage, database or other media used in the embodiments provided in the present application may include non-volatile and/or volatile memories. The non-volatile memory may comprise a read-only memory (ROM), a programmable read-only memory (PROM), an electrically programmable ROM (EPROM), an electrically erasable programmable ROM (EEPROM), or a flash memory. The volatile memory may include a random access memory (RAM) or an external cache memory. As an explanation rather than limitation, the RAM may be obtained in many forms, such as static RAM (SRAM), dynamic RAM (DRAM), synchronous DRAM (SDRAM), dual data rate SDRAM (DDRSDRAM), enhanced SDRAM (ESDRAM), synchlink DRAM (SLDRAM), rambus direct RAM (RDRAM), direct rambus dynamic RAM (DRDRAM), and rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of the present application, and their descriptions are specific and detailed, but cannot therefore be understood as limitations to the patent scope of the present application. It should be noted that those of ordinary skill in the art can make some variations and improvements without departing from the concept of the present application, and these variations and improvements all fall into the protection scope of the present application. Therefore, the patent protection scope of the present application should be subject to the appended claims.

What is claimed is:

1. A data processing method for image compression, comprising:
   segmenting an image to be compressed into a plurality of image matrices, and sequentially performing first matrix calculation on elements of the image matrices to obtain first intermediate matrices;
   configuring a storage space size according to a resolution and pixel component depth of the image to be compressed, configuring storage addresses of the first intermediate matrices according to a number of the first intermediate matrices, and storing the first intermediate matrices;
   reading the first intermediate matrices, performing second matrix calculation on elements of the first intermediate matrices and elements of a preset conversion matrix to obtain second intermediate matrices, and performing third matrix calculation on elements of the second intermediate matrices and the elements of the preset conversion matrix to obtain third intermediate matrices; and
   performing fourth matrix calculation on the preset conversion matrix and the third intermediate matrices to obtain result matrices, and encoding the result matrices to obtain a compressed image.

2. The data processing method for image compression according to claim 1, wherein the segmenting an image to be compressed into a plurality of image matrices, and sequentially performing first matrix calculation on elements of the image matrices comprises:
   obtaining at least one color channel, and segmenting the image to be compressed into a plurality of image matrices of a preset matrix size in the at least one color channel; and
   configuring the preset conversion matrix, and performing the first matrix calculation on one column of elements and another column of elements of the image matrices of the preset matrix size according to positive and negative values of the elements of the preset conversion matrix, wherein the preset conversion matrix is an orthogonal matrix, and the first matrix calculation comprises an addition operation.

3. The data processing method for image compression according to claim 2, wherein the method further comprises:
obtaining a matrix size of an image matrix and the resolution of the image to be compressed; and
obtaining a product of a number of the at least one color channel and the resolution of the image to be compressed, and obtaining a ratio of the product to the matrix size of the image matrix to obtain a number of the plurality of image matrices.

4. The data processing method for image compression according to claim 1, wherein the reading the first intermediate matrices, and performing second matrix calculation on elements of the first intermediate matrices and elements of a preset conversion matrix to obtain second intermediate matrices comprises:
performing a continuous read operation from a first address of a storage space to obtain the first intermediate matrices; and
performing the second matrix calculation on the elements of the first intermediate matrices and the elements of the preset conversion matrix, and superposing calculation results to obtain the second intermediate matrices, wherein the second matrix calculation comprises addition and multiplication operations.

5. The data processing method for image compression according to claim 1, wherein the configuring a storage space size according to a resolution and pixel component depth of the image to be compressed comprises:
according to the resolution and pixel component depth of the image, a mathematical expression for the storage space size being:

Space=(Res/Width)*((Pixel+1)*Width*Channel);

wherein Space is the storage space size, Res is the resolution, Pixel is the pixel component depth, Width is a size of the image matrices, Channel is a number of selected color channels, and the Res, Pixel, Width, and Channel are positive integers.

6. The data processing method for image compression according to claim 1, wherein the configuring storage addresses of the first intermediate matrices according to a number of the first intermediate matrices comprises:
according to the number and rows of the first intermediate matrices, a mathematical expression for the storage addresses being:

Addr=(M−1)*L_max*Length+(L−1)*Length, wherein Addr is a storage address of the storage addresses, M is a number index of a first intermediate matrix of the first intermediate matrices, L is a row index of the first intermediate matrix, L_max is a maximum number of rows of the first intermediate matrix, Length is a storage length occupied by each row of data in the first intermediate matrix, and the Addr, M, L, L_max, and Length are positive integers.

7. The data processing method for image compression according to claim 4, wherein the performing the second matrix calculation on the elements of the first intermediate matrices and the elements of the preset conversion matrix, and superposing calculation results to obtain the second intermediate matrices comprises:
taking a same or opposite data among a first row and column of elements of the preset conversion matrix as one group, combining the elements of a first intermediate matrix of the first intermediate matrices and the elements of the preset conversion matrix according to corresponding position information of the elements of the first intermediate matrix to form the elements of a second intermediate matrix of the second intermediate matrices.

8. The data processing method for image compression according to claim 1, wherein the performing third matrix calculation on elements of the second intermediate matrices and the elements of the preset conversion matrix to obtain third intermediate matrices comprises:
performing the third matrix calculation on the elements of the second intermediate matrices and the elements of the preset conversion matrix, and superposing calculation results to obtain the third intermediate matrices, wherein the third matrix calculation comprises addition and multiplication operations.

9. The data processing method for image compression according to claim 1, wherein the performing fourth matrix calculation on the preset conversion matrix and the third intermediate matrices to obtain result matrices, and encoding the result matrices to obtain a compressed image comprises:
multiplying and summing each row of elements of the preset conversion matrix with each column of elements of the third intermediate matrices sequentially to obtain the result matrices; and
performing quantification, differential encoding, run length encoding, and Huffman encoding on the result matrices to select a compression ratio, so as to obtain the compressed image.

10. The data processing method for image compression according to claim 9, wherein the multiplying and summing each row of elements of the preset conversion matrix with each column of elements of the third intermediate matrices sequentially to obtain the result matrices comprises:
calculating each element of a result matrix of the result matrices according to:

$$\Sigma_{i=1}^{8} C_{ij} * T_{ij},$$

wherein an element in an ith row and a jth column of the preset conversion matrix is Cij, an element in an ith row and a jth column of a third intermediate matrix of the third intermediate matrices is Tij, and an element in an ith row and a jth column of the result matrix is Yij.

11. The data processing method for image compression according to claim 9, wherein the performing quantification, differential encoding, run length encoding, and Huffman encoding on the result matrices to select a compression ratio, so as to obtain the compressed image comprises:
obtaining quantified coefficient matrices, quantifying the result matrices according to the quantified coefficient matrices to obtain a quantified result matrix, wherein the quantified result matrix comprises a direct component and alternating components;
encoding the direct component and a direct coefficient of a previous matrix by differential coding, arranging the alternating components and encoding by a run length; and
encoding the direct component and the alternating components using different Huffman encoding tables according to different color channels, and selecting the compression ratio to obtain a compressed image file.

12. The data processing method for image compression according to claim 11, wherein the direct component is an element in a first row and a first column of the quantified result matrix.

13. The data processing method for image compression according to claim 11, wherein the arranging the alternating components comprises:
  arranging the alternating components in a zigzag scan pattern.

14. The data processing method for image compression according to claim 1, wherein the storing the first intermediate matrices comprises:
  storing the first intermediate matrices in a form of matrix blocks.

15. The data processing method for image compression according to claim 1, wherein the storing the first intermediate matrices comprises:
  storing the first intermediate matrices in an in-chip cache of a system on chip.

16. The data processing method for image compression according to claim 1, wherein the method further comprises:
  calculating the number of the first intermediate matrices according to the resolution of the image to be compressed and a size of the image matrices.

17. The data processing method for image compression according to claim 1, wherein the preset conversion matrix is an orthogonal matrix, the elements of the preset conversion matrix have positive and negative values, and some of the positive and negative values have a same absolute value.

18. A computer device, comprising a memory and one or more processors, the memory storing computer-readable instructions, wherein when the computer-readable instructions are executed by the one or more processors, the one or more processors are configured to:
  segment an image to be compressed into a Plurality of image matrices, and sequentially perform first matrix calculation on elements of the image matrices to obtain first intermediate matrices;
  configure a storage space size according to a resolution and pixel component depth of the image to be compressed, configure storage addresses of the first intermediate matrices according to a number of the first intermediate matrices, and store the first intermediate matrices;
  read the first intermediate matrices, perform second matrix calculation on elements of the first intermediate matrices and elements of a preset conversion matrix to obtain second intermediate matrices, and perform third matrix calculation on elements of the second intermediate matrices and the elements of the preset conversion matrix to obtain third intermediate matrices; and
  perform fourth matrix calculation on the preset conversion matrix and the third intermediate matrices to obtain result matrices, and encode the result matrices to obtain a compressed image.

19. One or more non-volatile computer-readable storage media storing computer-readable instructions, wherein when the computer-readable instructions are executed by one or more processors, the one or more processors are configured to:
  segment an image to be compressed into a plurality of image matrices, and sequentially perform first matrix calculation on elements of the image matrices to obtain first intermediate matrices;
  configure a storage space size according to a resolution and pixel component depth of the image to be compressed, configure storage addresses of the first intermediate matrices according to a number of the first intermediate matrices, and store the first intermediate matrices;
  read the first intermediate matrices, perform second matrix calculation on elements of the first intermediate matrices and elements of a preset conversion matrix to obtain second intermediate matrices, and perform third matrix calculation on elements of the second intermediate matrices and the elements of the preset conversion matrix to obtain third intermediate matrices; and
  perform fourth matrix calculation on the preset conversion matrix and the third intermediate matrices to obtain result matrices, and encode the result matrices to obtain a compressed image.

20. The one or more non-volatile computer-readable storage media storing computer-readable instructions according to claim 19, wherein the computer-readable instructions, upon execution by the processor, is further configured to cause the processor to:
  obtain at least one color channel, and segment the image to be compressed into a plurality of image matrices of a preset matrix size in the at least one color channel; and
  configure the preset conversion matrix, and perform the first matrix calculation on one column of elements and another column of elements of the image matrices of the preset matrix size according to positive and negative values of the elements of the preset conversion matrix, wherein the preset conversion matrix is an orthogonal matrix, and the first matrix calculation comprises an addition operation.

* * * * *